(12) United States Patent
Takayama et al.

(10) Patent No.: US 7,136,657 B2
(45) Date of Patent: Nov. 14, 2006

(54) AREA-DEPENDENT SERVICE SYSTEM AND METHOD FOR MOBILE STATIONS

(75) Inventors: Kuniharu Takayama, Kawasaki (JP); Minoru Sekiguchi, Kawasaki (JP); Yoshiharu Maeda, Kawasaki (JP); Hirohisa Naito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 476 days.

(21) Appl. No.: 09/748,179

(22) Filed: Dec. 27, 2000

(65) Prior Publication Data

US 2001/0019960 A1    Sep. 6, 2001

(30) Foreign Application Priority Data

Mar. 2, 2000   (JP) .............................. 2000-057775

(51) Int. Cl.
*H04Q 7/20* (2006.01)
(52) U.S. Cl. ............................... 455/456.1; 455/432.1; 455/435.2

(58) Field of Classification Search ............. 455/456.1, 455/456.2, 456.3, 456.5, 456.6
See application file for complete search history.

(56) References Cited

FOREIGN PATENT DOCUMENTS

| JP | 6-189360 | 7/1994 |
|----|----------|--------|
| JP | 10-327097 | 12/1999 |

OTHER PUBLICATIONS

*Mobile Media Magazine*; Conducting Business with Positioning System Information Mobile Media Magazine, Sep. 1999, pp. 11-12.

*Primary Examiner*—Temica Beamer
(74) *Attorney, Agent, or Firm*—Staas & Halsey LLP

(57) ABSTRACT

A service database stores a set of area information and a service program for each individual service. When position information of a mobile station and service selection information are received, the service database is searched to retrieve a service program specified by the service selection information and corresponding area information. When the mobile station is present in the area represented by the area information, the service program is executed to provide a service to the mobile station.

13 Claims, 19 Drawing Sheets

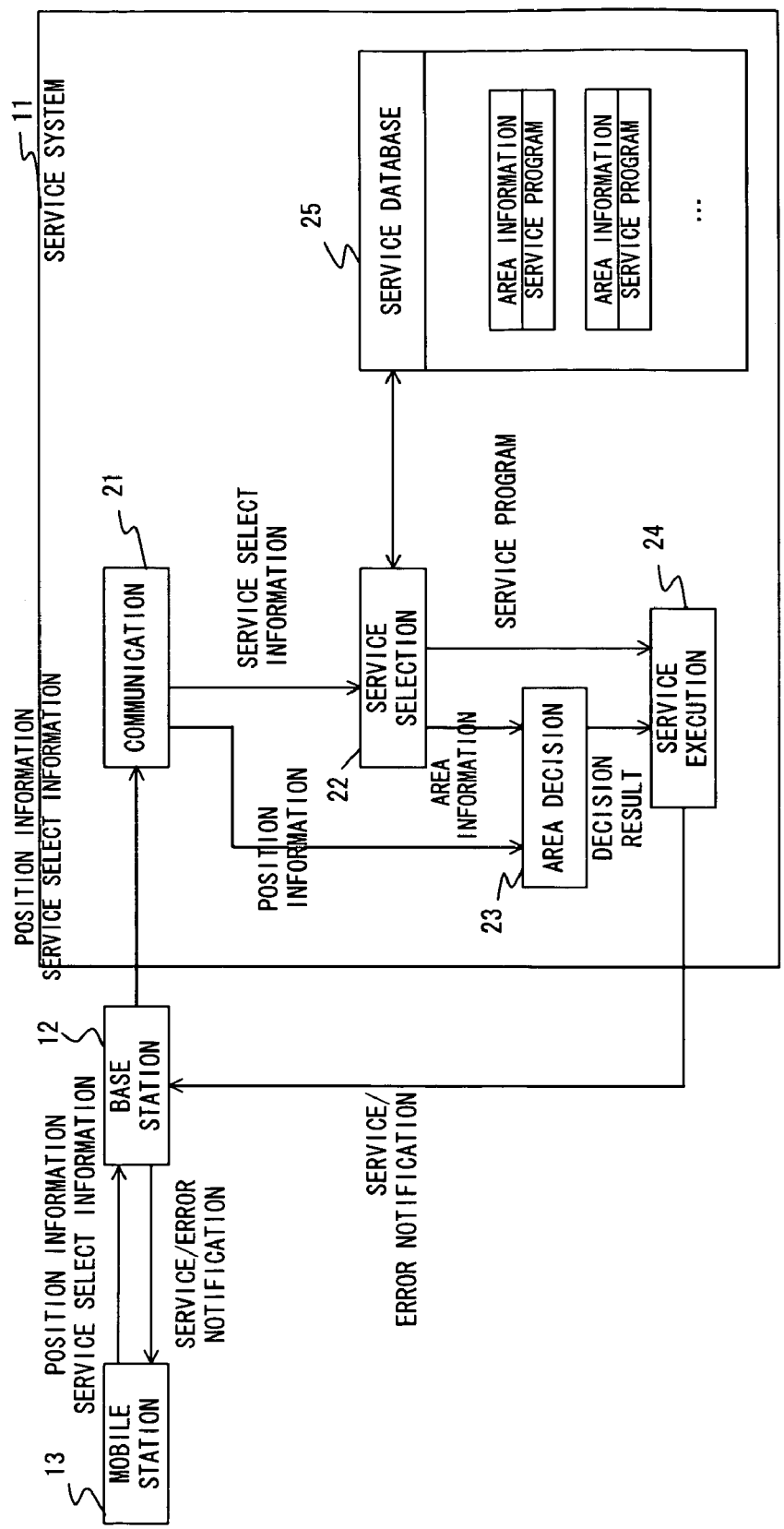
F I G. 2

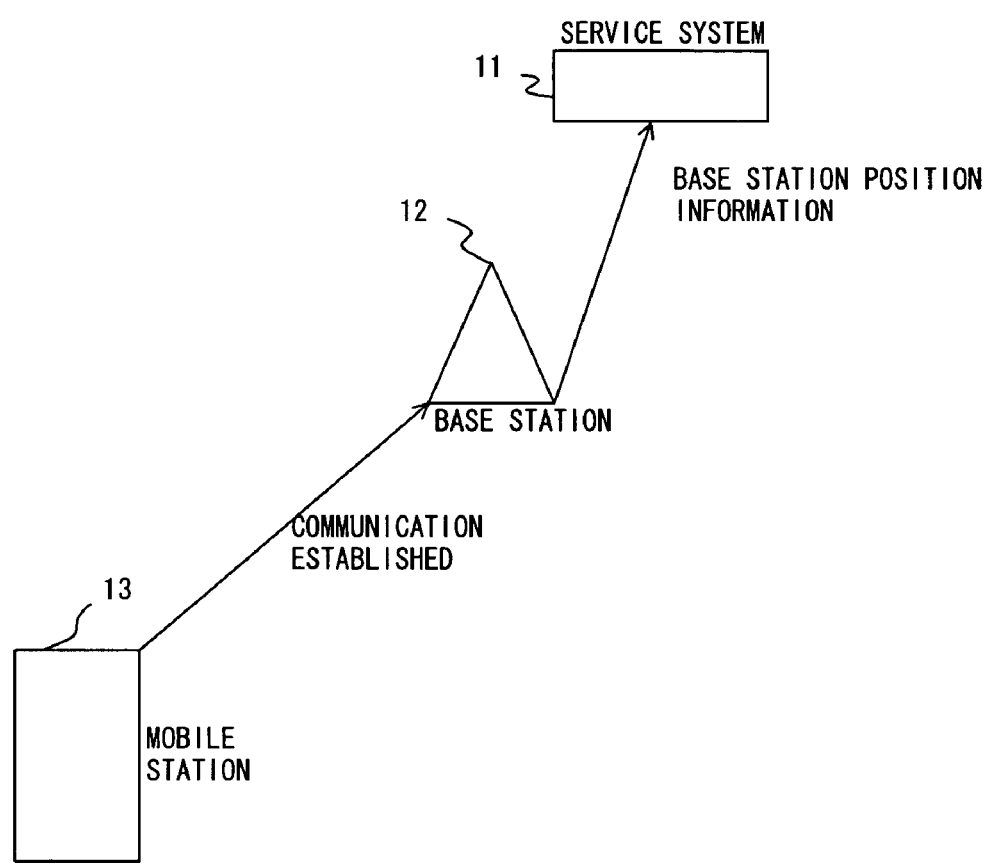
F I G. 4

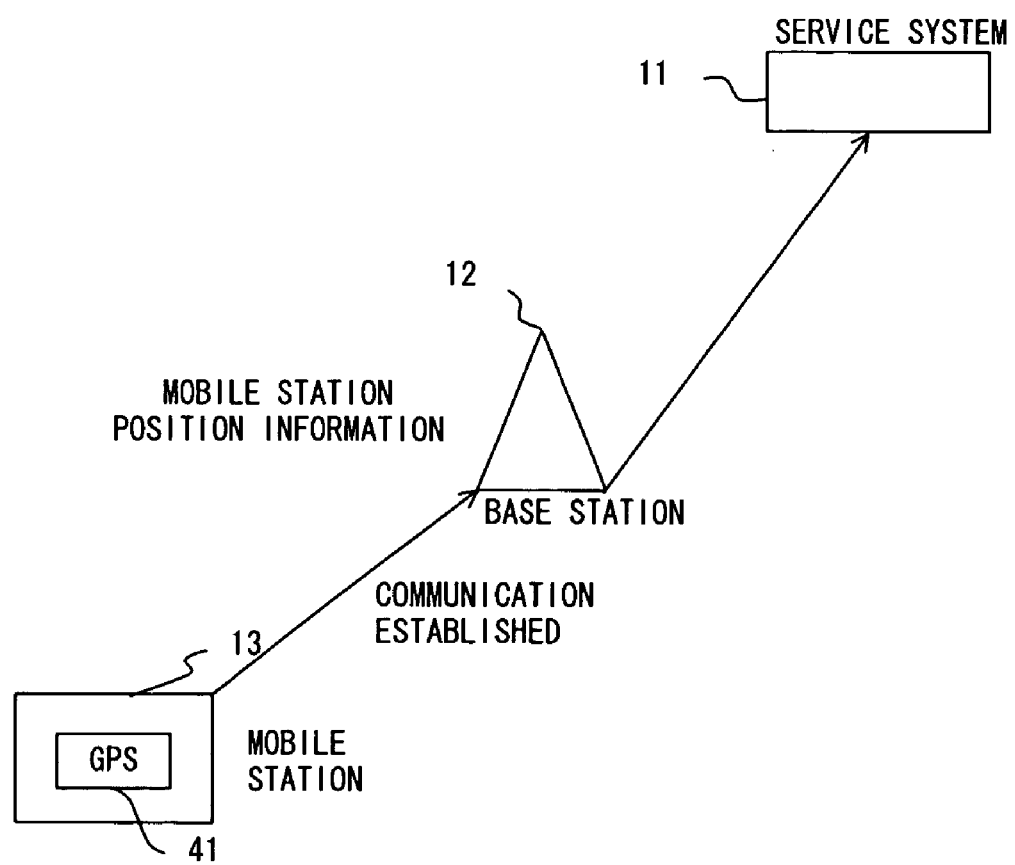
F I G. 5

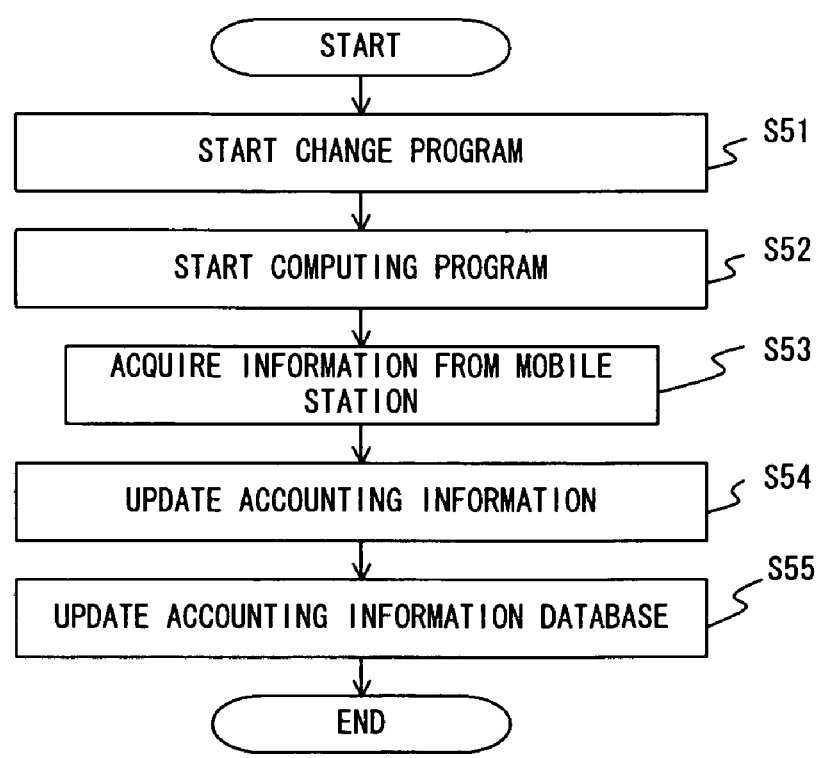
F I G. 1 7

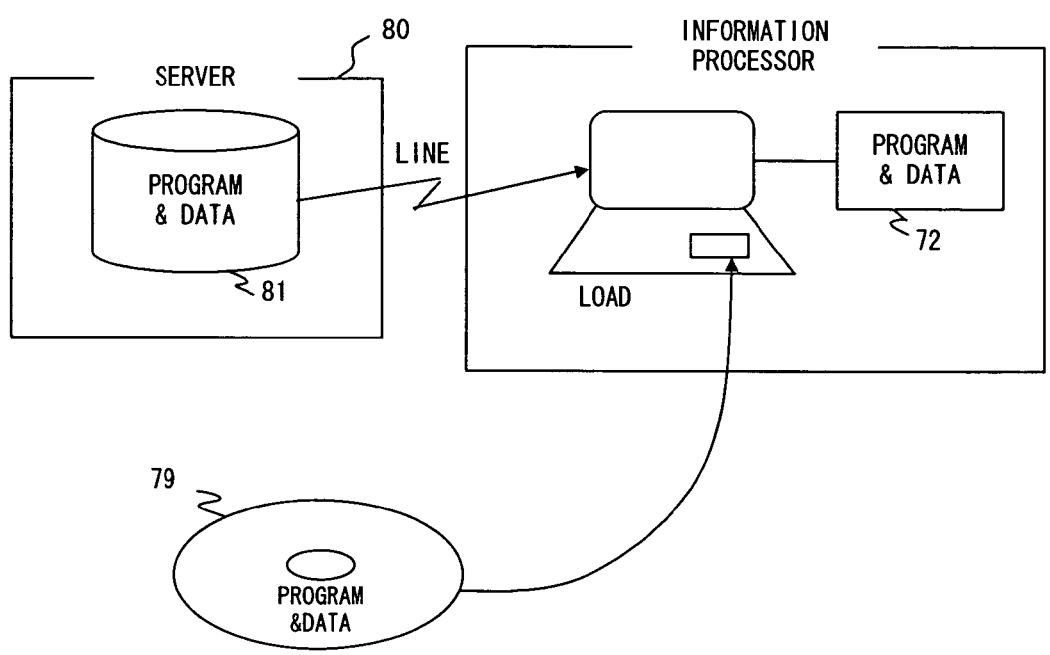
F I G. 19

AREA-DEPENDENT SERVICE SYSTEM AND METHOD FOR MOBILE STATIONS

BACKGROUND OF THE INVENTION

1. Field of the Invention

The present invention relates to a system and method for providing services to mobile stations such as cellular phones, personal digital assistants (PDAs), car navigation systems, etc.

2. Description of the Related Art

Conventionally, there have already been techniques to provide information services to mobile stations, such as cellular phones, PDAs, car navigation systems, etc., and to charge them. Among these, techniques to provide a service restricted to a particular area include the following:

(1) Japanese Unexamined Patent Publication No. 6-189360 [Area-Restricted Mobile Communications System]

With this technique, each portable terminal is preallocated to an area where communication is authorized. For example, when the service area of a cellular phone is described as the Kanto area only, communication is authorized only when that phone is in the Kanto area.

(2) Japanese Unexamined Patent Publication No. 10-327097 [Area-Restricted Mobile Station Information Providing System]

This technique relates to an information providing service system for portable terminals which is restricted to a particular small area. With this system, special devices, called sign posts, for providing services are placed at regular intervals in an area, and services are provided from the devices to portable terminals.

However, the above area-restricted service systems have the following problems:

With the system (1), a service area can be set up for each portable terminal, but it is impossible to set up an authorized area for each individual service. That is, it is impossible to, besides an area where a call can be made, set up an area where a particular information service is available, for example, in such a way that, outside a horse racetrack, a call can be made but access to tip information on horse races is prohibited.

With the system (2), since information is published from the sign posts placed at regular intervals, the service area is physically restricted to an area where a sign post is placed. It is therefore impossible to set up freely a service area through the use of software.

Thus, the conventional systems cannot freely set up a mobile station service area for each service.

SUMMARY OF THE INVENTION

It is an object of the present invention to provide a service system and method for mobile stations which permit each service to be restricted to a particular area without the need for any special device such as a sign post.

The inventive service system includes a storage device, a communication device, a selection device, an area decision device, and an execution device.

The storage device stores pieces of area information and service programs in such a way that they are made to correspond with each other. The communication device receives position information of a mobile station and service selection information. The selection device retrieves from the storage device a service program specified by the service selection information and area information corresponding to the specified service program.

The area decision device makes a decision of whether or not the position represented by the position information of the mobile station is included in the area represented by the retrieved area information. The execution device executes the retrieved service program to provide a service to the mobile station when the position of the mobile station is included in the area.

BRIEF DESCRIPTION OF THE SEVERAL VIEWS OF THE DRAWING

FIG. 2 shows the configuration of a first service system;

FIG. 4 is a diagram for use in explanation of a first position determining method;

FIG. 5 is a diagram for use in explanation of a second position determining method;

FIG. 17 is a flowchart for the account content change process;

FIG. 19 shows recording media.

DESCRIPTION OF PREFERRED EMBODIMENTS

The preferred embodiments of the present invention are described in detail below with reference to the drawings.

Figure 1:
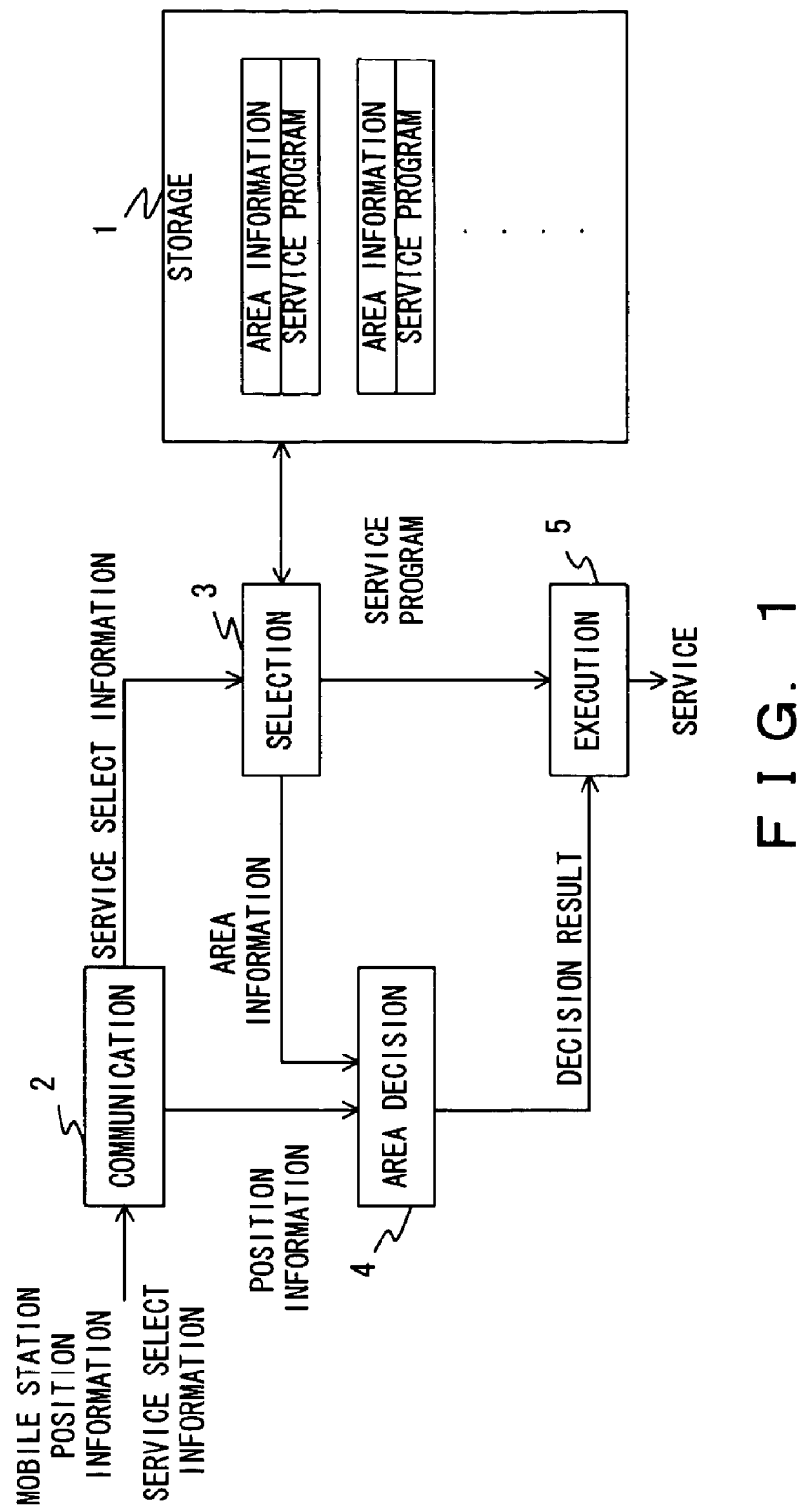
FIG. 1 is a diagram for use in explanation of the principle of the service system of the present invention.

FIG. 1 is a diagram for use in explanation of the principle of the service system of the present invention. The service system of FIG. 1 comprises a storage device 1, a communication device 2, a selection device 3, an area decision device 4, and an execution device 5.

The storage device 1 stores pieces of area information and service programs in such a way that they are made to correspond with each other. The communication device 2 receives the position information of a mobile station and service selection information. The selection device 3 retrieves a service program specified by the service selection information and area information corresponding to that service program from the storage device 1.

The area decision device 4 makes a decision of whether or not the position represented by the position information of the mobile station is included in the area represented by the retrieved area information. When the mobile station position is included in that area, the execution device 5 executes the retrieved service program to provide a service to the mobile station.

Upon receipt of the position information and the service selection information from the mobile station, the communication device 2 passes the position information and the service selection information to the area decision device 4 and the selection device 3, respectively. The selection device 3 upon receipt of the service selection information retrieves the service program and the corresponding area information from the storage device 1 and then passes the service program and the area information to the execution device 5 and the area decision device 4, respectively.

Upon receipt of the mobile station position information and the area information, the area decision device 4 makes a decision of whether or not the mobile station position is included in the area represented by the area information and then passes the result of decision to the execution device 5. When the decision result indicates that the mobile station position is included in that area, the execution device 5 executes the received service program. As a result, a service is provided from the service system to the mobile station.

According to such a service system, a service program for each individual service and area information representing an area where the service is provided are mapped to each other and the service is therefore provided when the mobile station stays in that area. Thus, each service can be restricted to a particular area.

Also, since services and areas are mapped through the use of software, there is no need of placing special devices, such as sign posts, and the area setup can be changed freely.

For example, the storage device 1 of FIG. 1 corresponds to a service database 25 of FIG. 2 and a service database 58 of FIG. 8, which will be described later. The communication device 2 of FIG. 1 corresponds to a communication section 21 of FIG. 2 and a communication section 51 of FIG. 8. The selection device 3 of FIG. 1 corresponds to a service selection section 22 of FIG. 2 and a service selection section 53 of FIG. 8.

Figure 8:
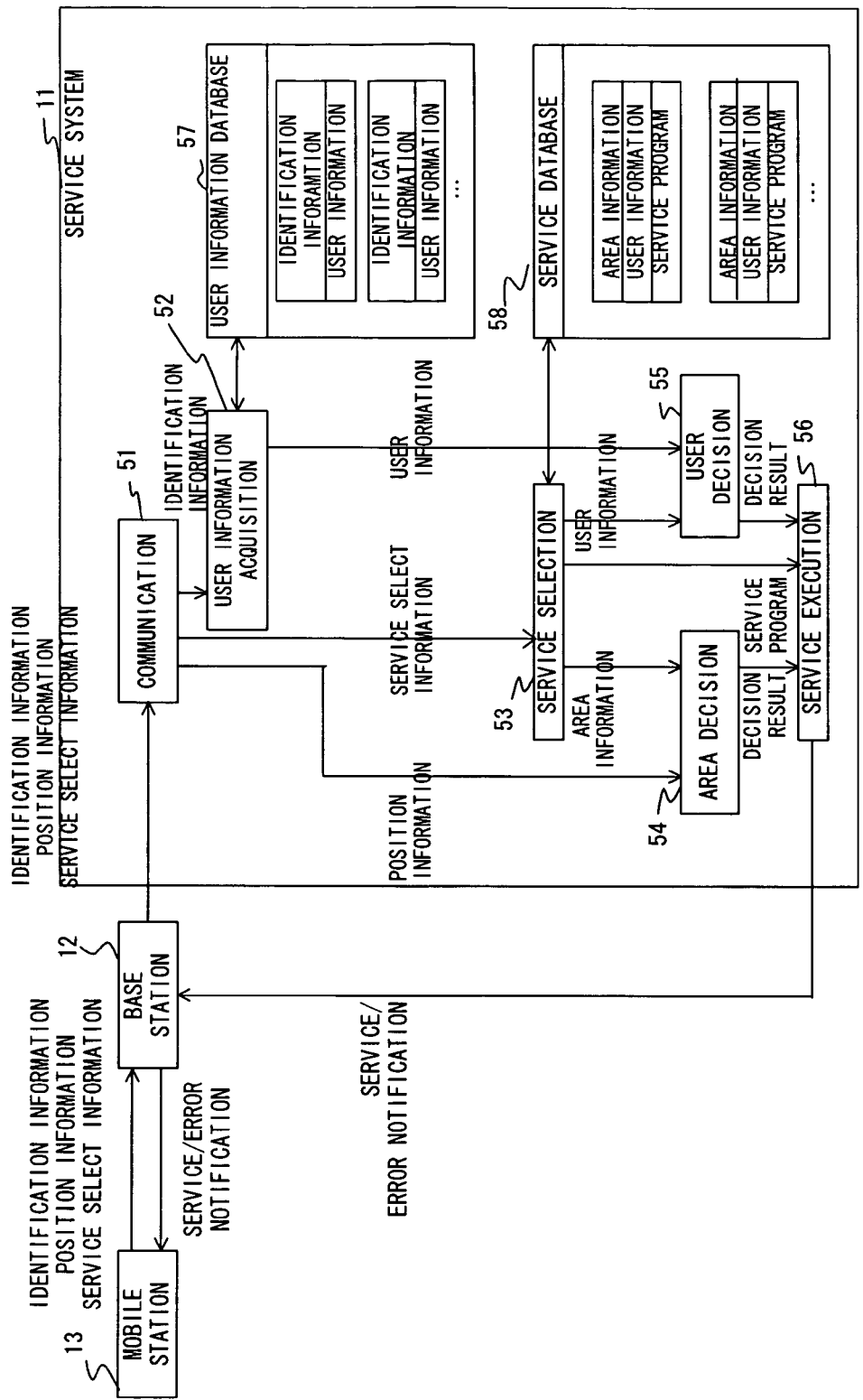
FIG. 8 shows the configuration of a second service system.

Also, the area decision device 4 of FIG. 1 corresponds to an area decision section 23 of FIG. 2 and an area decision section 54 of FIG. 8. The execution device 5 of FIG. 1 corresponds to a service execution section 24 of FIG. 2 and a service execution section 56 of FIG. 8.

In the present embodiment, a service for mobile stations is restricted to a particular area that can be set up freely and service contents and accounting contents are made to differ between the inside and the outside of the area. Such area-dependent services will include:

Information providing services or sight-seeing guide services in particular areas such as places of events, amusement parks/gaming places (for horse racing, bicycle racing, pinball, etc.), historic spots/scenic spots, secret facilities, etc.

Guide announcements to users in the neighborhood of stores or facilities (bargain information, event information, etc.)

Emergency communications to users in particular areas (control information, notice/warnings, evacuation advice, etc.)

Discounts/premiums in service charges in particular areas.

In the case of these services, it is sometimes advisable to restrict service areas in terms of business merits, security, or manners. Under such circumstances, the present invention will provide services to meet their respective purposes.

For example, new business can be realized by, in the place of an event, making the communication charge for mobile stations free so as to attract guests. Security can also be ensured by making it impossible to access information from the outside of secret facilities. Also, manners can be improved by making it impossible to buy pari-mutuel tickets outside the horse race track. Furthermore, services can be improved or differentiated by setting the communication charge low in city regions and high in mountain regions according to the prospects of redemption of equipment investments.

FIG. 2 shows the configuration of an area-dependent service system of the present embodiment. In FIG. 2, the service system 11 communicates with a mobile station 13 through a base station 12 to provide a service to it. The service system 11, which is computer-based, comprises a communication section 21, a service selection section 22, an area decision section 23, a service execution section 24, and a service database 25.

The service database 25 is prestored with a set of area information and a service program for each individual service. Thereby, authorized areas can be set up for each service.

Figure 3:
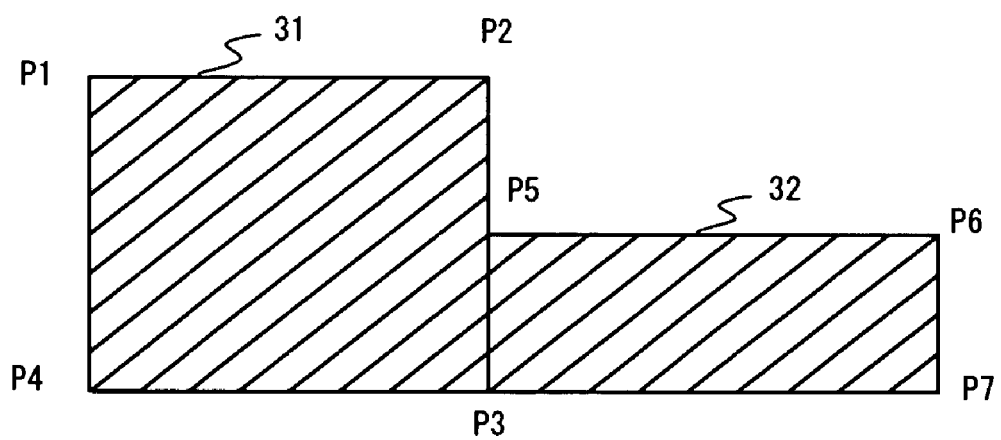
FIG. 3 shows an area.

FIG. 3 shows an example of an area represented by area information in the service database 25. The area of FIG. 3 comprises a rectangle 31 with P1, P2, P3 and P4 as vertices and a rectangle 32 with P5, P6, P7 and P3 as vertices. It is assumed here that the vertices have the following values:
P1: north latitude 035° 00' 50"/east longitude 140° 00' 00"
P2: north latitude 035° 00' 50"/east longitude 140° 00' 25"
P3: north latitude 035° 00' 00"/east longitude 140° 00' 25"
P4: north latitude 035° 00' 00"/east longitude 140° 00' 00"
P5: north latitude 035° 00' 25"/east longitude 140° 00' 25"
P6: north latitude 035° 00' 25"/east longitude 140° 00' 50"
P7: north latitude 035° 00' 00"/east longitude 140° 00' 50"

Using the latitude and longitude of the vertices, the area information is described as follows:
(north latitude from 035° 00' 00" to 035° 00' 50" and east longitude from 140° 00' 00" to 140° 00' 25") or
(north latitude from 035° 00' 00" to 035° 00' 25" and east longitude from 140° 00' 25" to 140° 00' 50")

Even if a service area makes a more complex figure like a curved figure, area information can likewise be described using latitude and longitude by approximating the area with a plurality of rectangular regions that cover the area.

The communication section 21 sets up the connection with the mobile station 13 and the service selection section 22 searches the service database 25 for a service program. The area decision section 23 makes a decision of whether the mobile station 13 is present in the authorized area for the selected service. The service execution section 24 executes the service program on the basis of the result of the decision. As the result of execution of the service program, the service is provided to the mobile station 13.

Methods for determining the current position of the mobile station 13 will include two methods: one using the position information of the base station 12; and the other using the position information of the mobile station itself.

FIG. 4 illustrates the first method using the position information of the base station 12. In FIG. 4, when the mobile station 13 establishes communication with the base station 12, the base station sends its position information to the service system 11 as an alternative to the position information of the mobile station 13. As the position information of the base station 12, latitude and longitude information, such as north latitude 035° 00' 40"/east longitude 140° 00' 10", has been preset.

FIG. 5 illustrates the second method using the position information of the mobile station 13. The mobile station of FIG. 5 has GPS (Global Positioning System) 41 built in and can therefore acquire its position information described in terms of latitude and longitude. When communication with the base station 12 is established, the mobile station 13 sends the acquired position information through the base station 12 to the service system 11.

Figure 6:
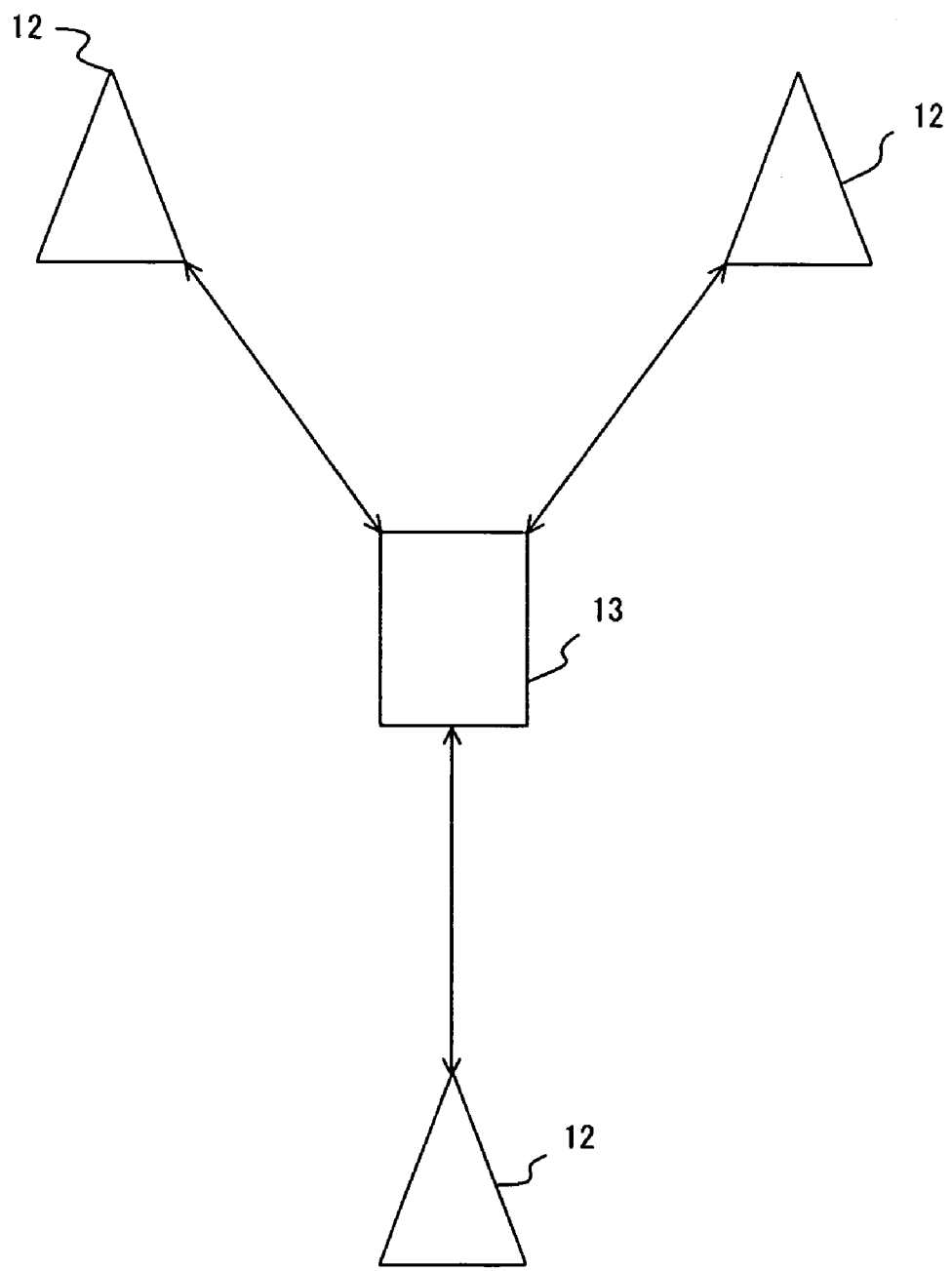
FIG. 6 is a diagram for use in explanation of a third position determining method.

In addition, as shown in FIG. 6, the position of the mobile station 13 can also be determined using a positional relationship among the mobile station and multiple base stations 12 (see *Mobile Media Magazine* published by incorporated company C. Media, vol. 51, pp. 11–12, September, 1999). According to this method, the mobile station 13 measures the intensity of an electric field from each of the base stations 12 and performs a simulation using the position information of each base station, whereby the position of the mobile station is computed.

Figure 7:
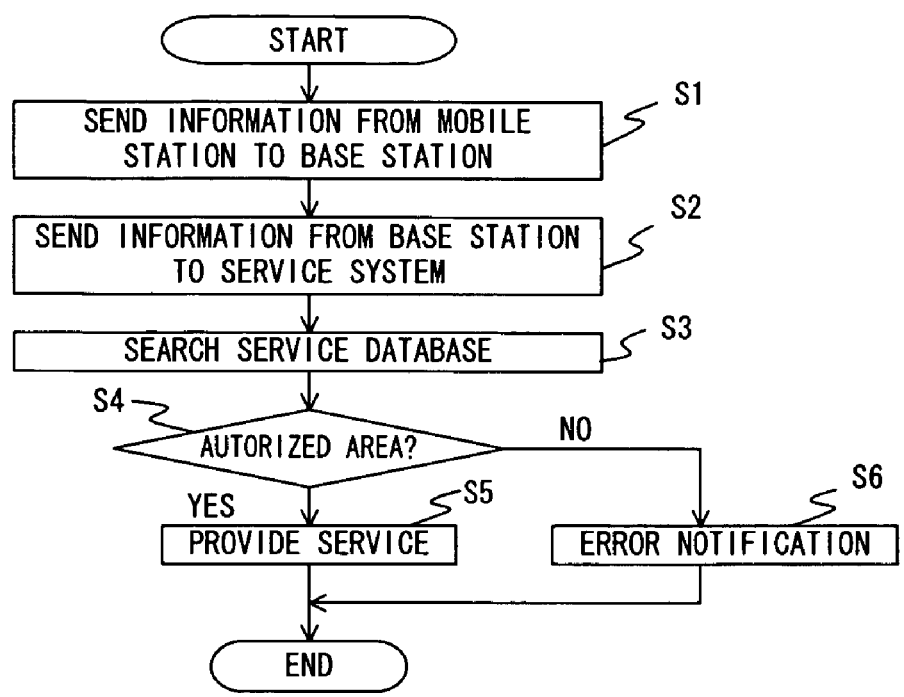
FIG. 7 is a flowchart for the first service providing process.

FIG. 7 is a flowchart for the service providing process by the service system of FIG. 2. First, the mobile station 13 sends service selection information to the base station 12 (step S1). The service selection information is usually made to correspond one-to-one with a service program. When the position determination method as shown in FIG. 5 is used, the position information of the mobile station 13 is sent together with the service selection information.

Next, the base station 12 receives the information sent from the base station 13 and then transmits it to the service system 11 (step S2). At this point, when the position determination method as shown in FIG. 4 is used, the position information of the base station 12 is sent to the service system 11 as the position information of the mobile station 13.

Next, the communication section 21 of the service system 11 receives the information sent from the base station 12 and then passes the service selection information to the service selection section 22 and the position information of the mobile station 13 to the area decision section 23.

Next, the service selection section 22 searches the service database 25 using the received service selection information as a key and then retrieves a set of corresponding area information and service program from the database 25 (step S3). The area information is passed to the area decision section 23 and the service program is passed to the service execution section 24.

Next, a decision is made in the area decision section 23 as to whether or not the position represented by the position information received from the communication section 21 is included in the area represented by the area information from the service selection section 22 (step S4). The result (YES or NO) is passed to the service execution section 24.

Next, the service execution section 24 refers to the received result of the decision and, if the result is YES, it executes the service program received from the service selection section 22 to provide the service to the mobile station 13 through the base station 12 (step S5). If, on the other hand, the result of the decision is NO, then error notification is sent through the base station 12 to the mobile station 13 (step S6). Thus, the mobile station 13 is notified that it is outside the service area.

Thus, by establishing a correspondence between areas and services using the service database 25, each service can be restricted to a particular area without providing any special device within the area. In addition, since the area information in the service database 25 can be rewritten as required, the authorized area for each service can be changed at will.

In the system of FIG. 2, a determination of whether a service is to be provided or not is based on the position information of the mobile station 13. In addition, it is also possible to determine whether to provide a service or not on the basis of user information of the mobile station 13.

FIG. 8 shows the configuration of such a service system as uses the user information. The service system comprises a communication section 51, a user information acquisition section 52, a service selection section 53, an area decision section 54, a user decision section 55, a service execution section 56, a user information database 57, and a service database 58.

The user information database 57 is prestored, for each mobile station, with a set of identification information for the mobile station or user and user information. As the identification information use may be made of the telephone number, IP (Internet Protocol) address, user ID, or the like. As the user information, attribute information, such as sex, age, etc., may be used.

The service database 58 is prestored, for each individual service, with a set of area information, user information, and a service program. Thereby, an authorized area and the attribute of an authorized user can be set up for each service.

The communication section 51 sets up the connection with the mobile station 13. The user information acquisition section 52 searches the user information database 57 to acquire the user information of the mobile station 13. The service selection section 52 searches the service database 58 to select a service program. The area decision section 54 makes a decision of whether or not the mobile station 13 is present in the area for the selected service. The user decision section 55 makes a decision of whether or not the user information of the mobile station 13 matches the user information of an authorized user for the selected service. The service execution section 56 executes the selected service program on the basis of the results of the decisions.

Figure 9:
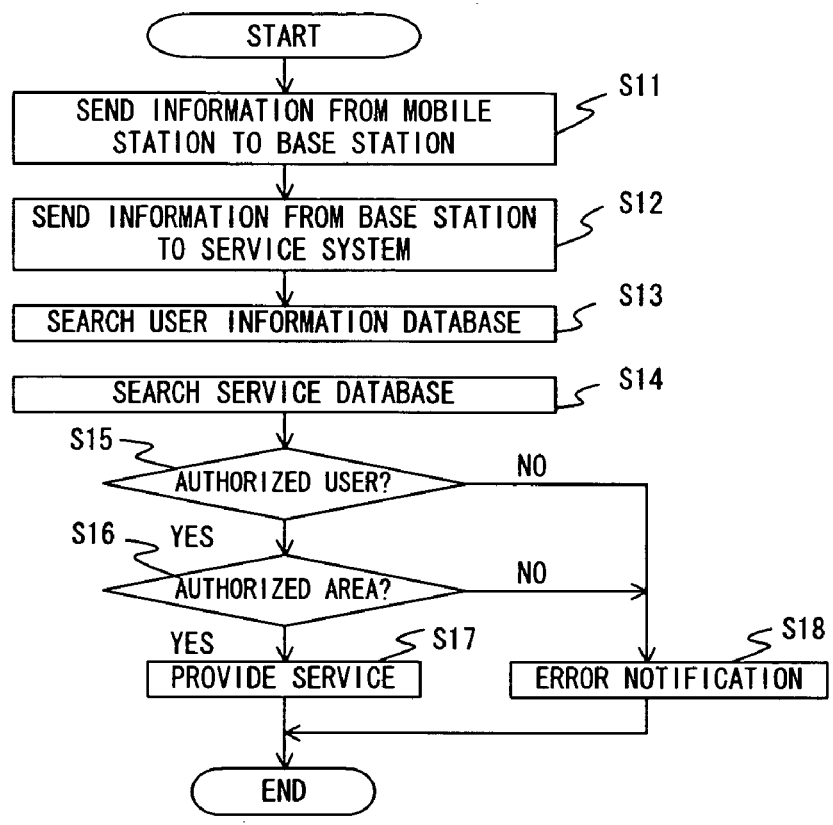
FIG. 9 is a flowchart for the second service providing process.

FIG. 9 is a flowchart for the service providing process by the service system of FIG. 8. First, the mobile station 13 sends identification information and service selection information to the base station 12 (step S11). When the position determination method as shown in FIG. 5 is used, the position information of the mobile station 13 is sent together with the service selection information.

Next, the base station 12 receives the information sent from the mobile station 13 and then transmits it to the service system 11 (step S12). At this point, when the position determination method as shown in FIG. 4 is used, the position information of the base station 12 is sent to the service system 11 as the position information of the mobile station 13.

Next, the communication section 51 of the service system 11 receives the information sent from the base station 12 and then passes the identification information to the user information acquisition section 52, the service selection information to the service selection section 52 and the position information of the mobile station 13 to the area decision section 54.

Next, the user information acquisition section 52 searches the user information database 57 using the received identification information as a key and retrieves the corresponding user information from the database 57 (step S13). The user information is then passed to the user decision section 55.

Next, the service selection section 53 searches the service database 25 using the received service selection information as a key and then retrieves a corresponding set of area information, user information and a service program from the database (step S14). The area information is passed to the area decision section 54, the user information is passed to the user decision section 55, and the service program is passed to the service execution section 56.

Next, the user decision section 55 makes a decision of whether or not the user information received from the user information acquisition section 52 matches the user information received from the service selection section 53 (step S15). The result of the decision (YES or NO) is then passed to the service execution section 56.

Next, a decision is made in the area decision section 54 as to whether or not the position represented by the position information received from the communication section 51 is included in the area represented by the area information from the service selection section 53 (step S16). The result (YES or NO) is passed to the service execution section 56.

Next, the service execution section 56 refers to the received results of the decisions from the user decision section 55 and the area decision section 54 and, if both the results are YES, executes the service program received from the service selection section 53 to provide the service to the mobile station 13 through the base station 12 (step S17).

If, on the other hand, either of the results of the decisions is NO, then error notification is sent through the base station 12 to the mobile station 13 (step S18). When the result of the decision by the user decision section 55 is NO, the mobile station 13 is notified of not being an authorized user. When the result of the decision by the area decision section 54 is NO, the mobile station 13 is notified of being outside the service area.

Thus, each service can be restricted to specific users by establishing a correspondence between users and services using the service database 58. In addition, since the area information in the service database 58 can be rewritten as required, authorized users for each service can be changed at will.

Specific examples of services will be described next with reference to FIGS. 10 through 17.

Figure 10:
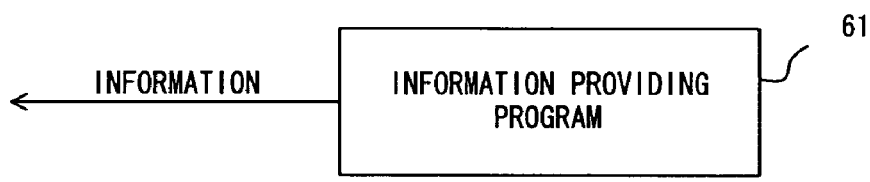
FIG. 10 shows an information providing service.

FIG. 10 shows an information providing service. An information providing program 61 of FIG. 10 is installed as the aforementioned service program and executed by the service execution section 56.

Figure 11:
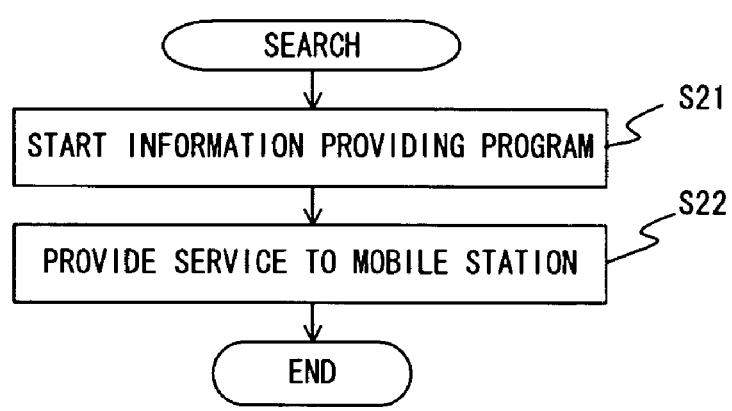
FIG. 11 is a flowchart for the information providing process.

FIG. 11 is a flowchart for the information providing process by the information providing program 61 of FIG. 10. First, the service execution section 56 starts the information providing program 61 (step S21). Next, the information providing program 61 provides requested information to the mobile station 13 via the base station 12 (step 22), thereby terminating the process.

Figure 12:
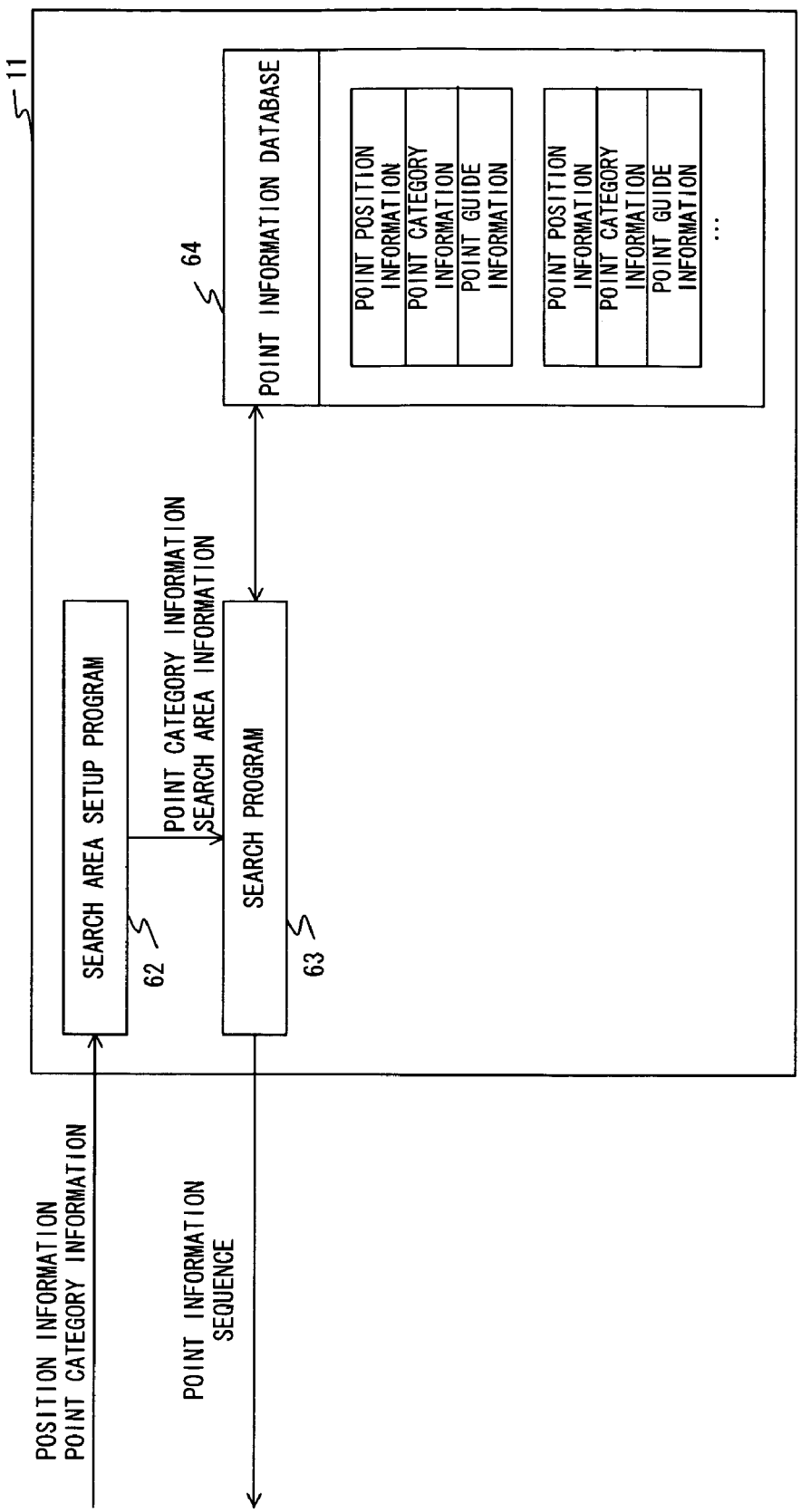
FIG. 12 shows a vicinity search service.

FIG. 12 shows a vicinity search service. A search area setup program 62 and a search program 63 of FIG. 12 are installed as the aforementioned service program and executed by the service execution section 56.

A point information database 64 is provided in the service system 11 and stores a set of point position information, point category information, and point guide information for each of registered points. The point position information is latitude and longitude information of the point. The point category information represents a category to which the point belongs (restaurants, amusement parks, etc.). The point guide information represents information that is provided to the mobile station 13.

Figure 13:
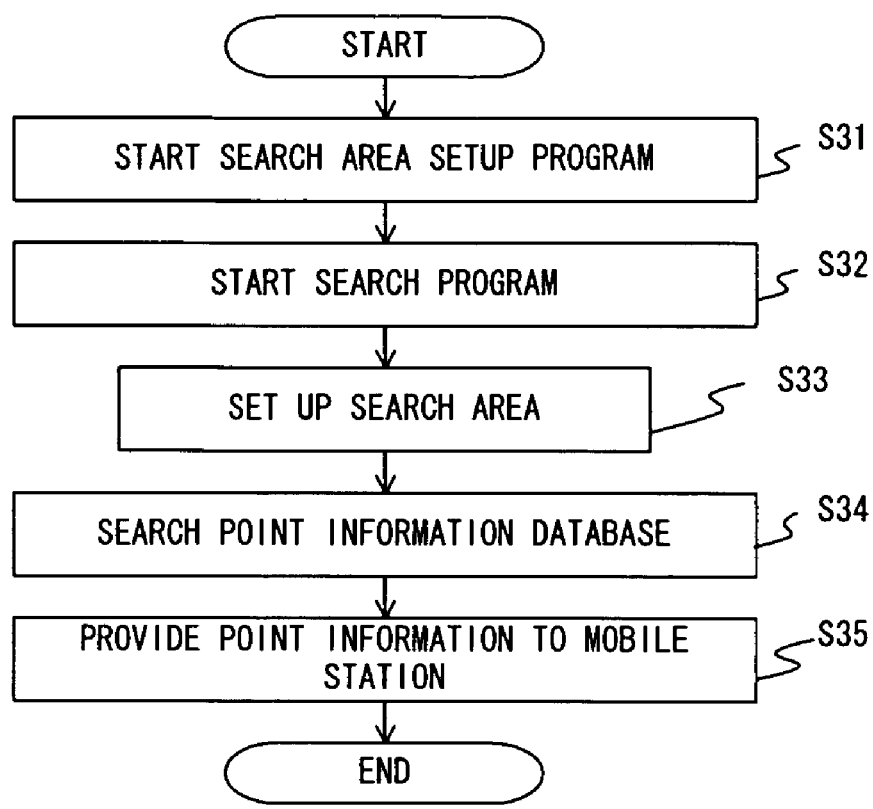
FIG. 13 is a flowchart for the vicinity search process.

FIG. 13 is a flowchart for the vicinity search process by the programs 62 and 63 of FIG. 12. First, the service execution section 56 starts the search area setup program 62 (step S31) and then starts the search program 63 (step S32). Next, the search area setup program 62 receives position information and point category information from the mobile station 13 through the base station 12 and the communication section (step S33). Based on the position information of the mobile station 13, the area in the vicinity of the mobile station 13 is set up as a search area. The point category information and the search area are then passed to the search program 63.

Next, the search program 63 searches the point information database 64 using the received point category information as a key and retrieves therefrom corresponding sets of point position information and point guide information (step S34). Usually, many points correspond to one piece of point category information; thus, many sets of information are retrieved.

Next, the search program 63 selects a point such that the position represented by the point position information is included in the search area and then provides the point guide information associated with the selected point as a point information sequence to the mobile station 13 through the base station 12 (step S35), thereby terminating the process.

According to such a service, bargain information or event information can be provided to users who are in the vicinity of stores or facilities.

Figure 14:
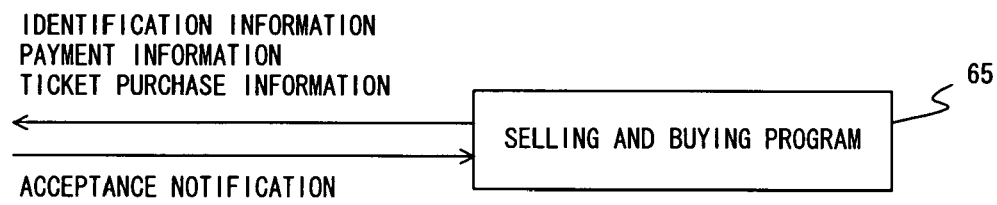
FIG. 14 shows a pari-mutuel ticket buying and selling service.

FIG. 14 shows a pari-mutuel ticket selling and buying service in a horse racetrack. A selling and buying program 65 of FIG. 14 is installed as the aforementioned service program and executed by the service execution section 56.

Figure 15:
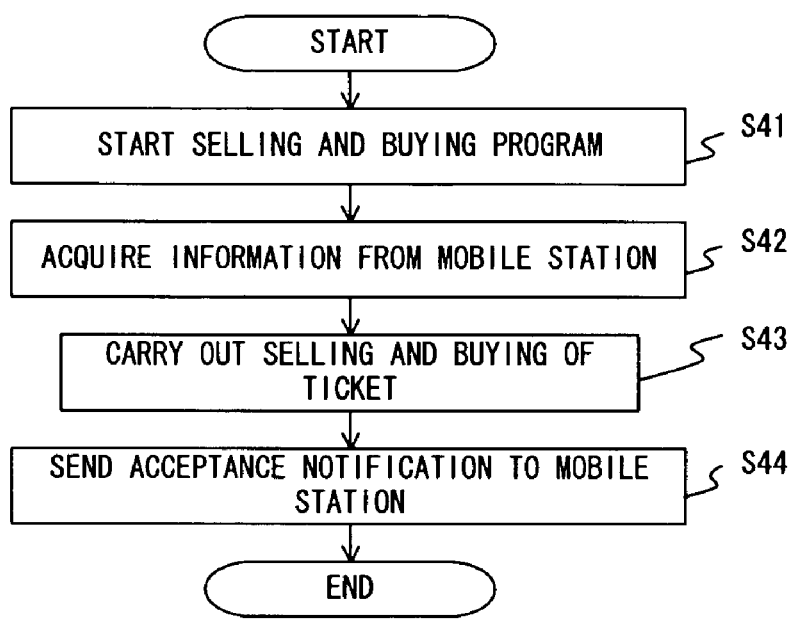
FIG. 15 is a flowchart for the pari-mutuel ticket buying and selling process.

FIG. 15 is a flowchart for pari-mutuel ticket selling and buying process by the program 65 shown in FIG. 14. First, the service execution section 56 starts the selling and buying program 65 (step 41). Next, the program 65 receives through the base station 12 and the communication section from the mobile station 13 identification information of the mobile station or user, payment information, and ticket purchase information (step S42). The selling and buying of a pari-mutuel ticket is carried out on the basis of the received information (step S43). An acceptance notification is then sent to the mobile station 13 on the basis of the result (step S44), thereby terminating the process.

Figure 16:
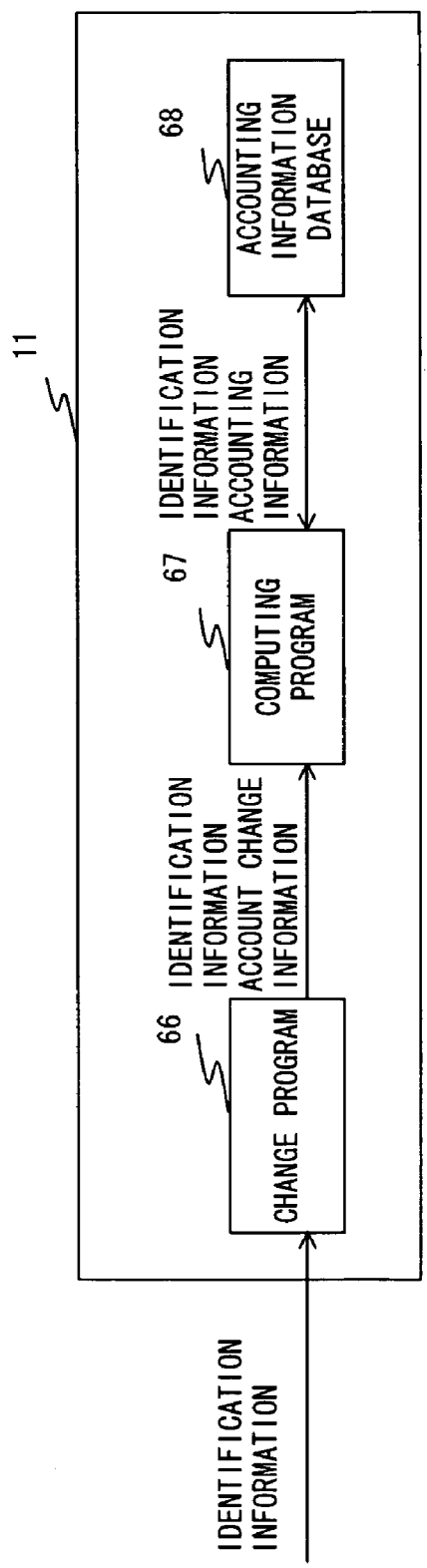
FIG. 16 shows an account content change service.

FIG. 16 shows an accounting content change service. A change program 66 and a computing program 67 of FIG. 16 are installed as the aforementioned service program and executed by the service execution section 56. An accounting information database 68 is provided in the service system 11 and stores accounting data for each user.

FIG. 17 is a flowchart for the account content changing process performed by the programs 66 and 67 of FIG. 16. First, the service execution section 56 starts the change program 66 (step S51) and then starts the computing program 67 (step S52).

Next, the change program 66 receives identification information of the mobile station or user from the mobile station 13 through the base station 12 and the communication section (step S53) and then passes the identification information and predetermined account change information to the computing program 67. The account change information includes a discount/premium at a constant rate, for example.

Next, the computing program 67 computes accounting information on the basis of the received information (step S54) and then updates accounting data for the corresponding user in the accounting information database 68 (step S55), thereby terminating the process.

According to such a service, a mobile station user who is present in a particular area can be charged at a discount/ premium for communication or information provided. Depending on the service contents, it is also possible to make the service charge free.

As described above, according to the service systems of FIGS. 2 and 8, it becomes possible to restrict a service to a particular area or make a different charge for a service provided inside and outside of an area. For example, it is possible to realize a service such that, inside a horse racetrack, a guide to the facilities is provided and tip information on a horse race is provided at the cost of 100 yen and, outside the racetrack, no guide to the facilities is provided and the tip data is provided at 900 yen.

In the above embodiments, the area information is described in terms of latitude and longitude. However, this is not restrictive. The area information may be described in terms of other information, such as address, zip code, school district, or the like.

Figure 18:
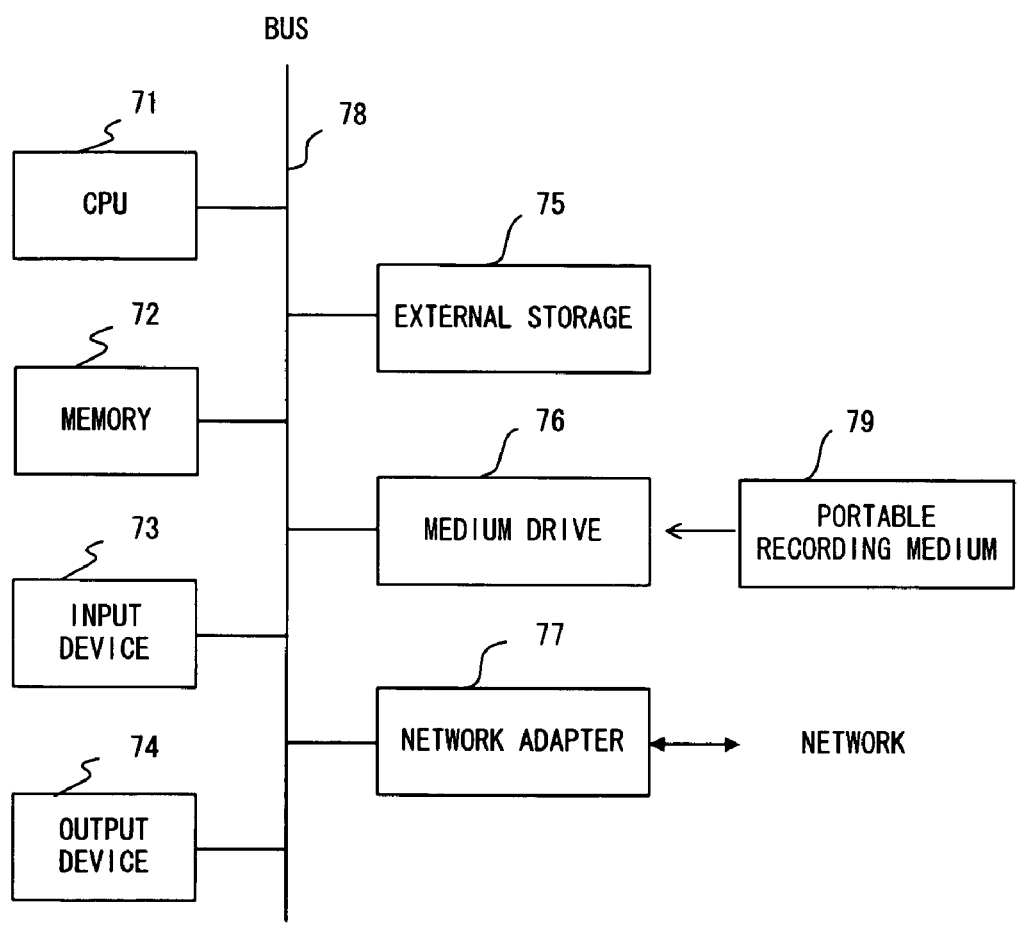
FIG. 18 is a block diagram of an information processing device.

The service system 11 and the mobile station 13 shown in FIGS. 2 and 8 may include, for example, such an information processor (computer) as shown in FIG. 18. The information processor of FIG. 18 comprises a CPU (Central Processing Unit) 71, a memory 72, an input device 73, an output device 74, an external storage device 75, a medium driver 76, and a network adapter 77, which are interconnected by a bus 78.

The memory 72 includes, for example, a ROM (Read Only Memory) and a RAM (Random Access Memory) and stores programs and data used for processing. The CPU 71 executes the programs using the memory 72, thereby performing required processing.

The communication section 21, the service selection section 22, the area decision section 23 and the service execution section 24 of FIG. 2 and the communication section 51, the user information acquisition section 52, the service selection section 53, the area decision section 54, the user decision section 55 and the service execution section 56 of FIG. 8 are all stored in the memory 72 as software components described by the programs.

The input device 73 is, for example, a keyboard, a pointing device, or a touch panel and used for entry of commands and information from an operator (user or administrator). The output device 74 is, for example, a display, a printer, or a loudspeaker and used to make inquiries to the operator and output the results of processing.

The external storage device 75 is, for example, a magnetic disk unit, an optical disk unit, a magneto-optical disk unit, or a tape unit. In the information processor, the above programs and data are prestored in the external storage device 75 and loaded into the memory 72 when necessary.

The external storage device 75 is also used as the service database 25 of FIG. 2, the user information database 57 and the service database 58 of FIG. 8, the point information database 64, and the accounting information database 68 of FIG. 16.

The medium driver 76 drives a portable recording medium 79 and makes access to the recorded contents of the medium 79. The portable recording medium 79 is a computer-readable recording medium, such as a memory card, a floppy disk, a CD-ROM (Compact Disk Read Only Memory), an optical disk, or a magneto-optical disk. The above programs and data are prestored by the operator on the portable recording medium 79 and loaded into the memory 72 when necessary.

The network adapter 77 is used for connection to a communication network to which the base station 12 is connected and makes data conversion involved in communication. The information processor receives the above programs and data through the network adapter 77 from another device and loads them into the memory 72 as required.

FIG. 19 shows computer-readable recording media which can provide programs and data to the information processor of FIG. 18. The programs and data stored on the portable recording medium 79 or in a database 81 of a server 80 are loaded into the memory 72. In this case, the server 80 produces a propagation signal to propagate the programs and data to the information processor over an arbitrary transmitting medium on the network. The CPU 71 then executes the programs using the data to carry out required processing.

According to the present invention, in a service system for mobile stations, a service can be restricted to a particular area without providing any special device in the area and the area setup can also be changed freely. Thus, new area-dependent service business for mobile stations can be realized.

What is claimed is:

1. A service system, comprising:
 a storage device storing a plurality of pieces of freely settable area information within a service coverage area and a plurality of selectable service programs for respective different services, each piece of area information corresponding to each selectable service program;
 a communication device receiving position information of a mobile station and service selection information;
 a selection device retrieving from the storage device a selectable service program based on the service selection information and retrieving area information corresponding to the retrieved selectable service program;
 an area decision device making a decision of whether a position represented by the position information of the mobile station is included in an area corresponding to the retrieved selectable service program; and
 an execution device executing the retrieved selectable service program to provide a service to the mobile station when the position is included in the area.

2. The service system according to claim 1, wherein, when the position is not included in the area, the execution device notifies the mobile station that the mobile station is outside a service area.

3. The service system according to claim 1, further comprising:
 a user decision device, and wherein the storage device stores a plurality of pieces of user information each of which corresponds to a selectable service program, the communication device receives user identification information, the selection device retrieves user information corresponding to the selectable service program, the user decision device makes a decision of whether a user represented by the identification information corresponds to the retrieved user information, and the execution device executes the retrieved selectable service program when the user corresponds to the retrieved user information.

4. The service system according to claim 1, wherein the communication device receives one of position information sent from the mobile station and position information of a base station which have established communication with the mobile station, as the position information of the mobile station.

5. A service system, comprising:
 a storage device storing freely settable area information corresponding to an area within a service coverage area and selectable service programs, the area information being set to correspond to any one of the selectable service programs;

a communication device receiving position information of a mobile station and service selection information;

a decision device determining whether a position represented by the position information of the mobile station is included in the area corresponding to any one of the selectable service programs, by using the position information of the mobile station and the service selection information; and an execution device executing said any one of the selectable service programs corresponding to the area information to provide a service to the mobile station within the service coverage area when the position is included in the area.

6. A mobile station, comprising:

a communication device transmitting service selection information to a service system which stores a plurality of pieces of freely settable area information within a service coverage area and a plurality of selectable service programs for respective different services, each piece of area information corresponding to each selectable service program; and a device receiving a service from the service system when the service system receives service selection information and position information of the mobile station, retrieves a selectable service program based on the service selection information and area information corresponding to the selectable service program, makes a decision of whether a position represented by the position information of the mobile station is included in an area represented by the retrieved area information, and executes the retrieved selectable service program based on a result indicating that the position is included in the area.

7. A computer-readable recording medium recorded with a program for enabling a computer to perform operations, comprising:

retrieving a specified selectable service program and area information corresponding to an area and to the specified selectable service program from a storage device storing freely settable area information within a service coverage area and a plurality of selectable service programs for respective different services, the area information being settable to correspond to any one of the selectable service programs;

deciding whether a position of a mobile station and service selection information is included in the area represented by the retrieved area information corresponding to the specified selectable service program using information of the position of the mobile station and the service selection information; and executing the retrieved selectable service program to provide a service to the mobile station within the service coverage area when the position is included in the area.

8. A service method, comprising:

storing a plurality of pieces of freely settable area information corresponding to an area within a service coverage area and a plurality of selectable services for respective different services, each piece of area information being set to correspond to at least one of the selectable services;

deciding whether a position of a mobile station and service selection information is included in the area corresponding to a selectable service selected by the mobile station using information of the position of the mobile station and the service selection information; and providing the selected service to the mobile station within the service coverage area when the position is included in the area.

9. A service system, comprising:

storage means for storing a plurality of pieces of freely settable area information within a service coverage area and a plurality of selectable service programs for respective different services, each piece of area information corresponding to each selectable service program;

communication means for receiving position information of a mobile station and service selection information;

selection means for retrieving from the storage device a selectable service program based on the service selection information and area information corresponding to the selectable service program;

area decision means for making a decision of whether a position represented by the position information of the mobile station is included in an area corresponding to the retrieved area information; and execution means for executing the retrieved selectable service program to provide a service to the mobile station when the position is included in the area.

10. A computer-readable medium having a program stored therein to cause a computer to perform operations, comprising:

receiving a service request for a specified service program;

retrieving the specified service program and area information corresponding to an area and to the specified service program from a storage device storing a plurality of pieces of freely settable area information within a service coverage area and a plurality of selectable service programs for respective different services, each piece of area information correspondingly set to at least one of the service selectable service programs;

deciding whether a position of a mobile station and service selection information is included in the area corresponding to the retrieved area information of the specified service program using information of the position of the mobile station and the service selection information; and executing the retrieved specified service program to provide a service to the mobile station when the position is included in the area.

11. A service system, comprising:

a storage device storing area information for at least three areas within a service coverage area and at least three selectable service programs corresponding to the areas, the selectable service programs providing different services;

a communication device receiving position information of a mobile station and service selection information;

a decision device determining whether a position represented by the position information of the mobile station is included in an area represented by the area information using the position information of the mobile station and the service selection information; and an execution device executing a selected one of the at least three selectable service programs corresponding to the area information to provide a service to the mobile station when the position is included in the area.

12. A service method to provide a mobile station with a selected service program among selectable service programs offered, comprising:

linking area information within a service coverage area to any one of the selectable service programs;

receiving position and service selection information of the mobile station; and providing the selected service program to the mobile station upon determining that the received position information of the mobile station corresponds to the linked area information of the selected service program using the position information of the mobile station and the service selection information.

13. A method of providing selectable service programs to a mobile station, comprising:

detecting position information of the mobile station and service selection information responsive to a service program request indicating any one of the selectable service programs; and providing a service program among the selectable service programs to the detected position information of the mobile station using the position information of the mobile station and the service selection information.

* * * * *